United States Patent [19]
Sinclair et al.

[11] Patent Number: 5,747,822
[45] Date of Patent: May 5, 1998

[54] METHOD AND APPARATUS FOR OPTICALLY DIGITIZING A THREE-DIMENSIONAL OBJECT

[75] Inventors: Michael J. Sinclair, Atlanta, Ga.; Frank E. Vitz, Lincoln, Mass.

[73] Assignee: Georgia Tech Research Corporation, Atlanta, Ga.

[21] Appl. No.: 710,459

[22] Filed: Sep. 18, 1996

Related U.S. Application Data

[63] Continuation of Ser. No. 329,501, Oct. 26, 1994, abandoned.
[51] Int. Cl.$^6$ .................................................. G01B 11/00
[52] U.S. Cl. ......................... 250/559.19; 250/559.22; 250/578.1; 356/376
[58] Field of Search ..................... 250/559.19, 559.22, 250/559.23, 559.24, 578.1; 356/375, 376, 384, 385, 387, 388

[56] References Cited

U.S. PATENT DOCUMENTS

| | | | |
|---|---|---|---|
| 4,343,553 | 8/1982 | Nakagawa et al. | 356/376 |
| 4,406,544 | 9/1983 | Takada et al. | 356/376 |
| 4,752,064 | 6/1988 | Okada et al. | 382/1 |
| 4,794,262 | 12/1988 | Sato et al. | |
| 4,846,576 | 7/1989 | Maruyama et al. | 356/376 |
| 5,305,092 | 4/1994 | Mimura et al. | 356/376 |
| 5,377,011 | 12/1994 | Koch | 356/376 |

OTHER PUBLICATIONS

"Cyberware" advertising literature, Cyberware Laboratory, Inc. 21 pages, earliest known date: May 1990 (date of printing).

"Hyperspace" advertising literature, Mira Imaging, Inc., 7 pages, earliest known date: 1991.

*Primary Examiner*—Stephone B. Allen
*Attorney, Agent, or Firm*—Deveau, Colton & Marquis

[57] ABSTRACT

An apparatus and method for digitizing an object for creating a three-dimensional digital model of the object comprises a turntable for rotating the object about a rotation axis, at least first and second light sources positioned and oriented for directing a thin sheet of light toward the object along an illumination plane substantially parallel to and substantially intersecting with the rotation axis, a first detector positioned to one side of the illumination plane and oriented for detecting light reflected along a first detection plane from the object for creating a plurality of first side contours as the object rotates, a second detector positioned to a side of the illumination plane, opposite the one side, for detecting light reflected along a second detection plane from the object for creating a plurality of second side contours as the object rotates, a third detector for capturing illumination on-axis contours in the form of a vertical straight line to derive an instantaneous color of the object's surface as a function of the height of the object, and a combining and evaluating computer for combining the first side contours, the second side contours, and the illumination on-axis contours for generating a plurality of composite contours and for evaluating the composite contours for creating a three-dimensional digital model of the object.

16 Claims, 3 Drawing Sheets

METHOD AND APPARATUS FOR OPTICALLY DIGITIZING A THREE-DIMENSIONAL OBJECT

This is a continuation of application Ser. No. 08/329,501 filed on Oct. 26, 1994 now abandoned.

TECHNICAL FIELD

The present invention relates to optical scanning and digitization, and particularly relates to an apparatus and method for scanning and digitizing objects for creating three-dimensional digital models.

BACKGROUND OF THE INVENTION

Scientific visualization is a technique allowing a scientist, engineer, or artist to visualize, through the use of computer graphics, a complex set of data. The data may represent a recorded experiment, a mathematical model used to simulate real phenomena, or an accurate representation of a three-dimensional object. The tasks of formatting and providing for input of the data to be visualized, as well as determining how to combine the data numerically for generation of graphic images, are formidable. In the case of numerically depicting actual three-dimensional objects as computer models, the visualizer must choose a computer modeling method of inputting data that yields the desired results with a minimum of effort and resources.

One common method of computer modeling is that of forming a collection of primitive three-dimensional shapes to represent the object, known as polygonal modeling. Polygonal modeling programs are found in some commercially available computer rendering and animation packages and typically contain tools for defining, manipulating, and combining basic shapes, such as spheres, cones, cubes, planes, lines, etc. However, portraying a complex object, such as a human body, can be a tedious and time consuming task using this technique.

A two-dimensional graphics tablet can be used to assist the modeler in defining arbitrary flat shapes for subsequent computer manipulation in three dimensions by extrusion, rotation, concatenation, etc. Unfortunately, this technique is relatively nonintuitive and rather cumbersome.

In recent years, the so-called three-dimensional stylus digitizers have been developed for graphic input. These enable the computer modeler to enter points into the computer, one data point at a time, by placing the stylus on the three-dimensional object at successive, predefined locations. For digitizing a human body, a solid physical model of the body is produced and then is visibly marked with a grid to make the placement of the stylus a more straightforward task. The stylus then is placed on the object, grid point by grid point, to enter a large number, typically in the thousands, of three-dimensional coordinates into the computer. Once enough points are entered, the computer mathematically connects the points with short line segments, thereby forming an array of planar structures (polygons) which form the desired surface of the object. Known three-dimensional stylus digitizers generally suffer from being expensive and requiring much care and time in operation.

Another known three-dimensional input device is the so-called optical scanner. Typical optical scanners consist of a fixed platform with an orbiting digitizing camera and light source, a control unit, and a host computer. As the digitizing camera rotates around the object, it takes a large number of measurements using a laser for illumination. The laser light source is used to sweep (scan) across the object while the camera captures the location of the intersection of the laser light with the object. This collection of intersections is converted to a polygonal model in much the same way as the known stylus digitizers. These optical scanners typically suffer from being expensive and limited to a specific size range of objects (owing to the orbit of the camera about the object).

Accordingly, it can be seen that a need yet remains for a simple, economical optical digitizer apparatus and method which is easily operated and is well suited for use with objects of widely differing sizes. It is to the provision of such that the present invention is primarily directed.

SUMMARY OF THE INVENTION

Briefly described, in a preferred form the present invention comprises an apparatus for digitizing an object for creating a three-dimensional digital model of the object. The apparatus includes a turntable means for rotating the object about a rotation axis and at least first and second light source means positioned and oriented for directing a thin sheet of light toward the object along an illumination plane. The illumination plane is substantially parallel to and substantially intersecting with the rotation axis.

A first detector means is positioned to one side of the illumination plane and is oriented for detecting light reflected along a first detection plane from the object for creating a plurality of first side contours as the object rotates. A second detector means is positioned to a side of the illumnination plane, opposite said one side, for detecting light reflected along a second detection plane from the object for creating a plurality of second side contours as the object rotates. Combining and evaluating means are provided for combining the first side contours and the second side contours for generating a plurality of composite contours and for evaluating the composite contours for creating a three-dimensional digital model of the object.

Preferably, the first and second, and possibly additional light source means each comprises a means for generating a non-scanning sheet of light, with the sheets of light from the light sources being directed along spatially separated paths which are non-parallel to one another as demonstrated in FIG. 3.

Also preferably, the first and second detector means comprise first and second black and white cameras and a color camera is further provided for detecting an instantaneous color value of the object. The combining and evaluating means is adapted for storing the instantaneous color value along with the composite contours.

In another preferred form, the present invention comprises a method of digitizing an object for creating a three-dimensional digital model of the object, the method comprising the steps of:

(a) rotating the object about a rotation axis;

(b) directing a thin sheet of light onto the object along an illumination plane substantially parallel to and substantially intersecting with the rotation axis;

(c) detecting light reflected from the object along a first detection plane for creating a plurality of first side contours as the object rotates;

(d) detecting light reflected along a second detection plane from the object for creating a plurality of second side contours as the object rotates;

(e) combining the first side contours and the second side contours for generating a plurality of composite contours; and (f) evaluating the composite contours for creating a three-dimensional digital model of the object.

The method and apparatus according to the present invention have several advantages. For example, the invention is useful with objects of widely different sizes. Also, the invention, by using two or more light sources situated in a common plane, avoids the creation of shadows and thereby more reliably records all features. The invention also is easily and quickly used and is capable of functioning with ordinary incoherent light sources, such as incandescent illumination.

Accordingly, it is a primary object of the present invention to provide an optical digitizer apparatus and method which is efficient is operation, economical in manufacture, and durable in use.

It is another object of the present invention to provide an optical digitizer apparatus and method which is useful with a wide variety of sizes of objects to be digitized.

It is another object of the present invention to provide an optical digitizer apparatus and method which is easily and quickly used.

It is another object of the present invention to provide an optical digitizer apparatus and method which minimizes the number of features which might be missed during digitization due to shadows and occluding surfaces.

It is yet a further object of the present invention to provide an optical digitizer apparatus and method which is well-suited for use with ordinary incandescent light sources or video projectors, thereby avoiding the expense and safety issues (whether real or perceived) of using laser light.

These and other objects, features, and advantages of the present invention will become apparent upon reading the following specification in conjunction with the accompanying drawing figures.

BRIEF DESCRIPTION OF THE DRAWING FIGURES

DETAILED DESCRIPTION OF THE PREFERRED EMBODIMENTS

Figure 1:
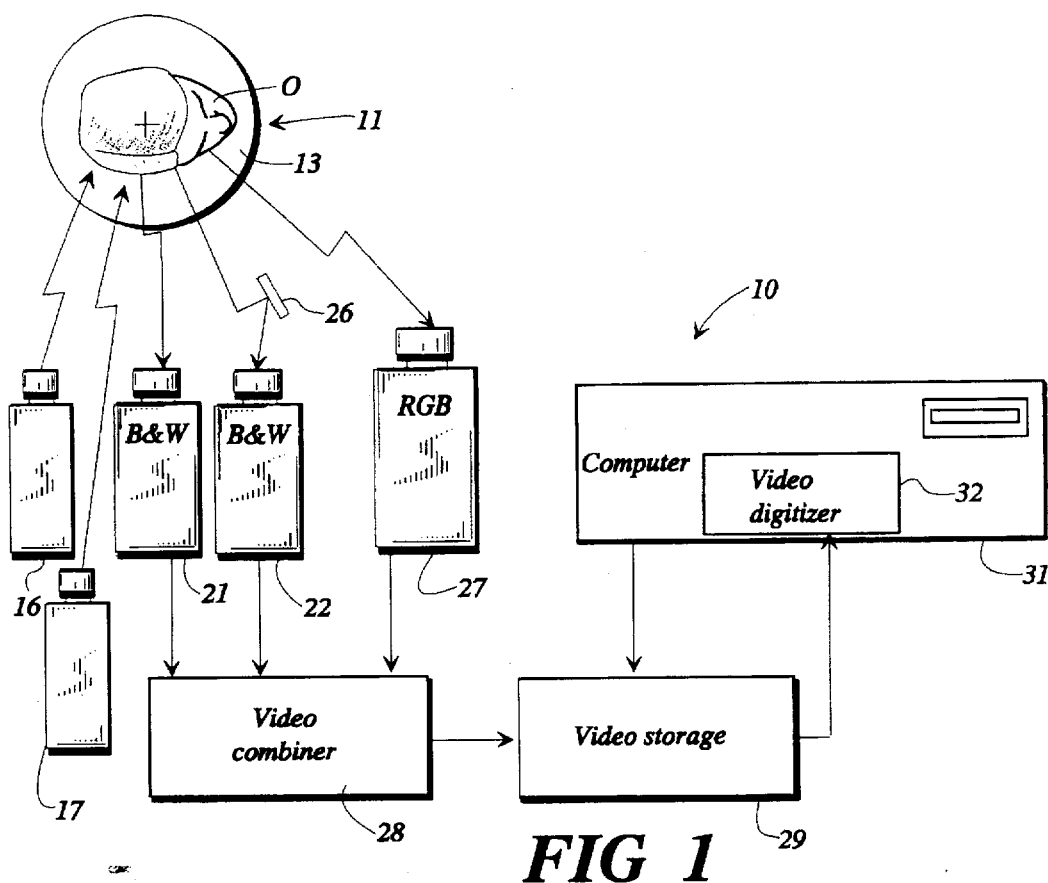
FIG. 1 is a schematic illustration of an optical digitizer apparatus according to a preferred form of the invention, shown in conjunction with an object to be digitized.
Figure 2:
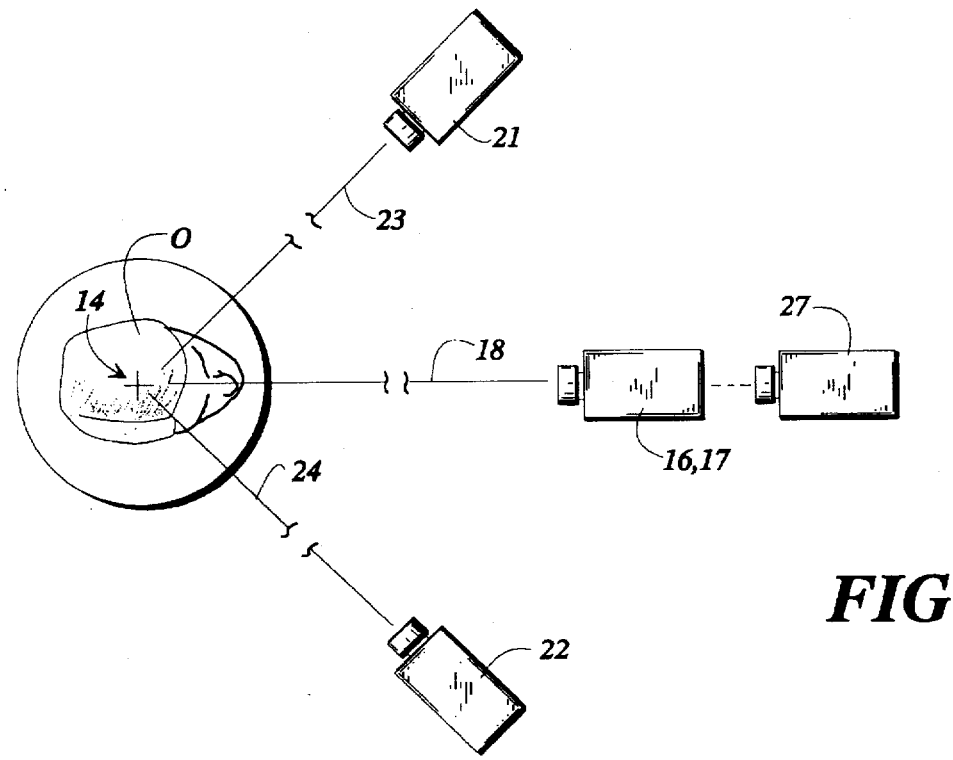
FIG. 2 is a schematic plan view of a portion of the optical digitizer apparatus of FIG. 1.
Figure 3:
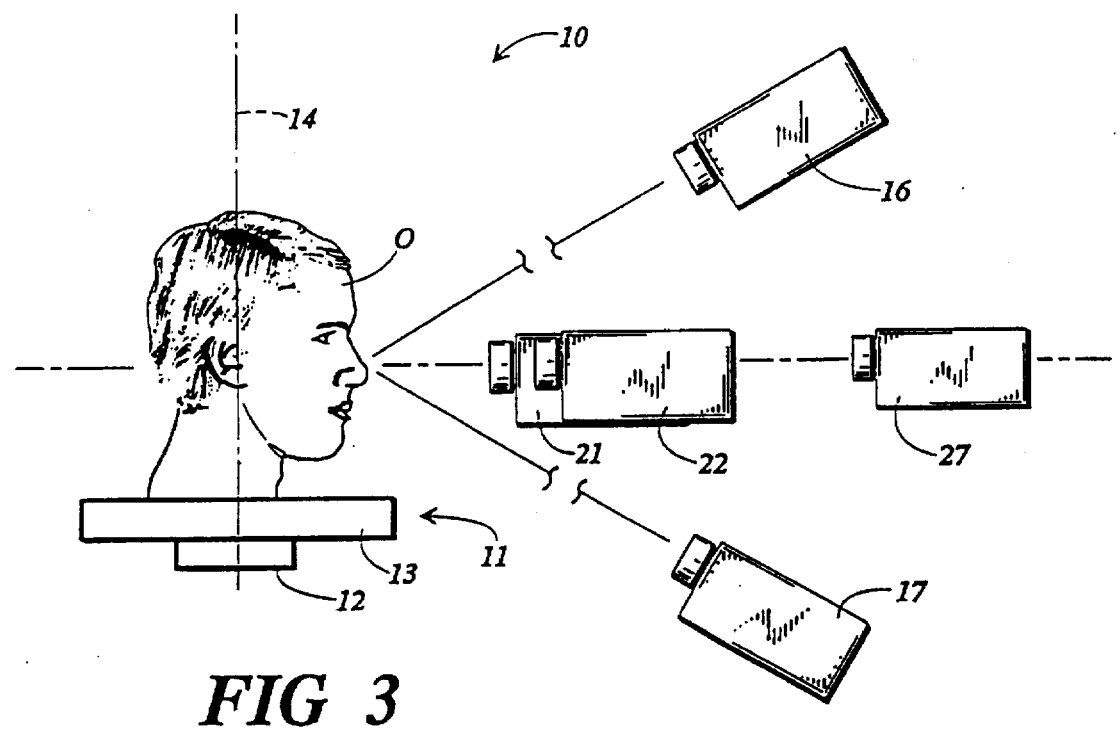
FIG. 3 is a schematic side view of a portion of the optical digitizer apparatus of FIG. 1.

Referring now in detail to the drawing figures, wherein like reference numerals represent like parts throughout the several views, FIGS. 1-3 generally show an optical digitizer apparatus 10 according to a preferred form of the invention, shown in conjunction with an object O to be digitized. The digitizer apparatus 10 includes a turntable 11 having a support base 12 and a upper rotary platform 13 rotatably mounted to the support base 12 for rotation about a rotation axis 14. The upper rotary platform 13 is rotatably mounted to the support base 12 by means of a high-precision turntable bearing (unshown), such as a ring bearing or other suitable means. It is important that the upper rotary platform 13 rotate smoothly and constantly in a true manner about the axis of rotation 14 with minimal radial movement, for reasons which will become apparent below.

Figure 5:
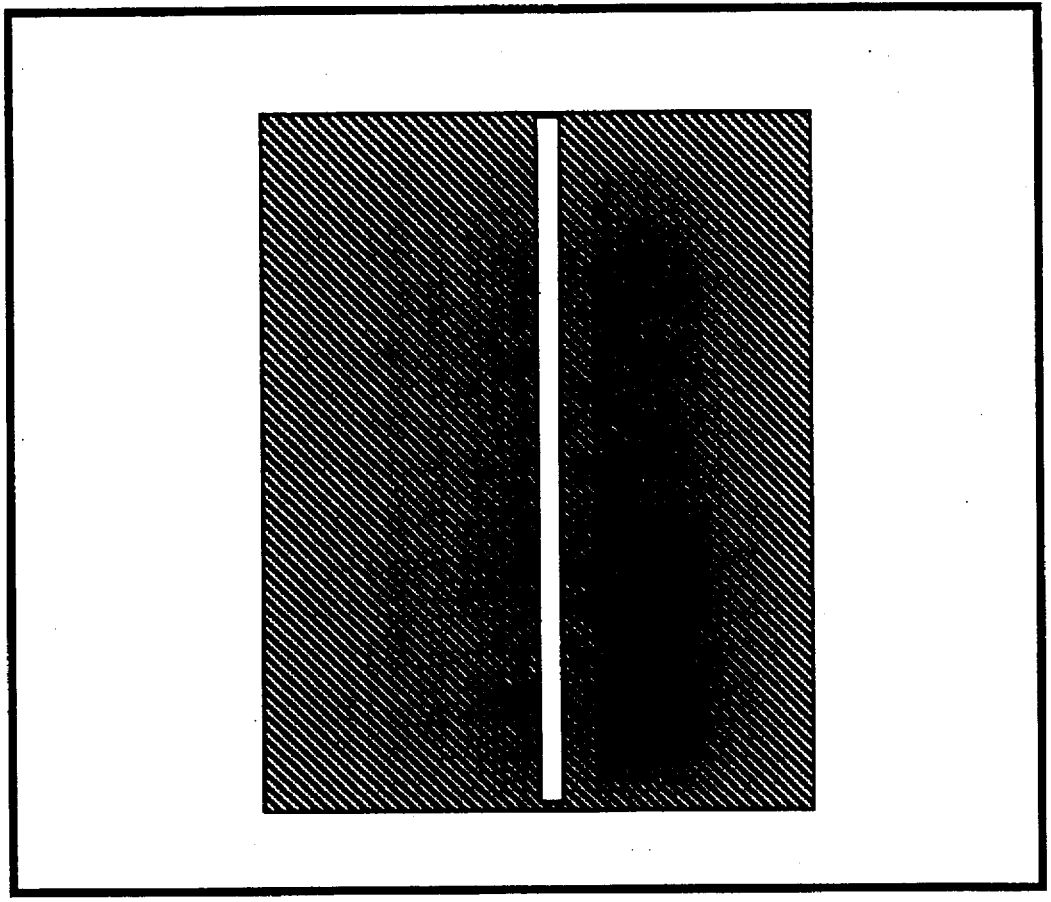
FIG. 5 is a depiction of a film slide with a clear vertical slit for use in connection with the present invention.

Two light sources 16, 17 are positioned to be trained on the object O to illuminate the object. Each of the light sources generates ordinary white light and projects a thin planar sheet of light along a common illumination plane 18 toward the object O (See FIG. 2). Each of the light sources 16, 17 produces a thin sheet of light which is substantially parallel to and substantially intersecting with the rotation axis 14. One practical, low-cost way of implementing the light sources is to provide commercially available slide projectors aimed at the axis of rotation and to use a slide in each of the projectors which limits the output light to a single vertical sheet of light. This can be done by making the slide opaque and forming a narrow clear vertical slit in the opacity as shown in FIG. 5. Of course, other means of producing a thin planar sheet of light can be employed. It is also envisioned that a video projector could also provide the light source thereby adapting the geometry of the light image to the object for better coverage. What is important is that a thin planar sheet of light be provided which is parallel to and coextensive with the rotation axis 14.

As shown in FIG. 3, the light sources 16 and 17 preferably are arranged so that one (light source 16) is positioned above the object O, while the other (light source 17) is positioned below the object O. This has the advantage of minimizing or avoiding shadows when illuminating the object, thereby ensuring that features are digitized reliably rather than being obscured.

Two black-and-white video cameras 21, 22 are positioned on opposite sides of illumination plane 18. The cameras 21 and 22 are each trained on the object O for detecting light reflected therefrom along detection planes 23, 24. The detection planes 23, 24 are each positioned at a 45° angle with respect to the illumination plane 18. Close alignment of the detection planes 23, 24 with the rotation axis 14 is not critical; rather, what is important is that the cameras be trained on the object O in a manner to allow the object to be captured as an image by the cameras. This non-critical alignment is a result of the fact that the light reflected from the object O is diffused and therefore is reflected in all directions and that the cameras will be precisely calibrated according to their placements. Thus, the angle between the detection planes 23, 24 and the illumination plane 18 is not critical.

As shown in FIGS. 1 and 2, each black-and-white camera 21, 22 produces a video image 46 from the diffused light from object O. A precise calibration scheme is invoked so as to be able to exactly superimpose these two contour images for evaluation.

A third camera 27 in the form of a component color camera (RGB) is positioned along illumination plane 18 and is trained on the object O at the rotation axis 14. As shown in FIG. 3, the RGB camera 27 generally is positioned level with the object O and with the black-and-white detection cameras 21, 22. The RGB camera 27 captures an illumination on-axis contour in the form of a vertical straight line 44 to derive an instantaneous color value 44 of the object's surface as a function of the height of the object. This color value 44 is combined with the side contours 42 of the image, as will be described in more detail below. The outputs from the black-and-white cameras 21 and 22 and from the RGB camera 27 are presented to a video combiner 28 for combination. The video combiner 28 combines the three images from each of the cameras as one video frame. Assuming each of the cameras are genlocked or synchronized to a central reference, the three videos are combined together. The left and right contour images 42 are time-multiplexed on alternating National Television Standards Committee (NTSC) fields and the RGB image 44 is analog combined with each contour 42. The output of the video combiner 28 is directed to a video digitizer associated with a computer 31 for digitizing and manipulating the images. Preferably, the computer 31 includes a video digitizer 32 such as a commonly available video digitizer to plug into the computer.

In a prototype device actually constructed and operated experimentally, commercially available Sony® brand black-and-white charge couple device (CCD) cameras and a Sony® brand RGB color camera were used. Also, a TARGA+graphics card from True Vision, Inc. was used in conjunction with an IBM® compatible 80386-33 type computer utilizing a rendering software package known as 3D Studio by AutoDesk. This card also served as the video digitizer 32 connected to the video combiner 28. Of course, other commercially available devices or custom built devices can be incorporated in the present invention.

OPERATION

To use the apparatus, the object to be digitized is first positioned upon the turntable 11 and centered about the rotation axis 14 as closely as possible. Also, the light sources 16 and 17 are trained on the illumination axis 18. To align the light from the light sources with the rotation axis 14, it can be useful to use a calibration object having a narrow vertical rod which can be easily centered and then can act as an indicator of the rotation axis.

As the object to be digitized rotates, the black-and-white video cameras 21, 22 view the object from each side and capture the resulting contour images. The resulting two images 42 are combined electronically by the video combiner 28, resulting in each video field containing one of the contour images, such as that shown in FIG. 3. These two contours 42 are mathematically combined and superimposed in the computer using precomputed camera calibration algorithms. Using two cameras positioned on opposite sides of the illumination plane produces continuous contours 42 even when one of the cameras' view of the contour is partially blocked by an occluding feature of the object, such as for example a person's nose. (From one side of the occluding object the contour is not visible by the camera, while from the other side of the occluding feature, a camera can easily "see" that part of the image.) The composite side profile or contour is used in conjunction with the instantaneous color value derived by the RGB camera 27 for creating a color contour 44 of the surface of the object.

Figure 4:
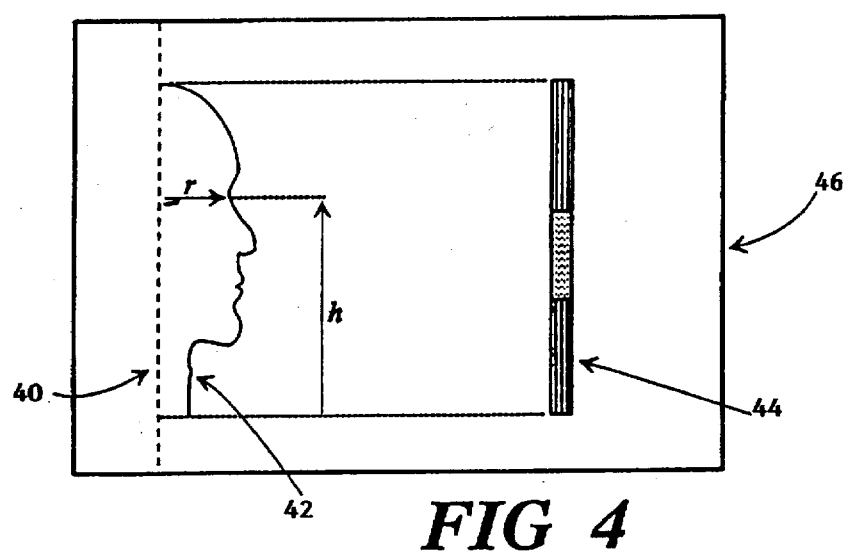
FIG. 4 is a schematic view of a typical video signal stored for analyzation by the apparatus of FIG. 1, including a composite black-and-white side profile of the object and a linear, color-texture map corresponding to the side profile.

The contour images 42, including the on-axis contour representing the instantaneous color value 44, are retrieved from computer storage and input to the computer for processing. Each frame of raw video 46 is evaluated along scan lines and local subpixel maxima are determined representing the precise location of the contours 42 and texture map 44. The two contours 42 are then combined mathematically, forming a single resulting composite contour containing information from both side views. Where an image piece is absent on one contour due to occlusion, it normally is filled in by the other contour. Distance along the scan line (as measured horizontally as shown in FIG. 4) from the axis of rotation 40 to the maximum image value of the contour 42 represents the radial distance (r) in three-dimensional cylindrical coordinates of that datum point on the object, while the scan line represents the height (h) in cylindrical coordinates, and the individual frame number stored in the computer represents the angle (theta) in cylindrical coordinates. The mathematical array of these three cylindrical coordinate values, along with the color 44, accurately represents the surface of the object in three-dimensional space and can be used in conventional modeling, rendering, and animation computer programs, such as 3D Studio.

It is possible to replace one or both of the light sources 16, 17 (or any additional light sources) with a steerable light source that can scan across (vertically and/or horizontally) the surface of the object in a manner to effectively minimize or eliminate shadows and occlusions. This is particularly useful with regard to digitizing complex objects. One way of accomplishing this is to use a video projector and to control the input signal in a way to cause the image projected by the video projector to appear as a line (or a dot) that can be repositioned ("steered") at will. Using such an arrangement, normally occluded regions can be scanned efficiently in at least three (3) methods.

The first of the three methods involves rotating the object to be digitized through a complete rotation with a planar light sheet trained on the rotation axis. During this first rotation, the object is digitized as described above. Occluded regions can be recognized by the computer and the locations thereof noted. The planar light sheet is then moved/reoriented so that it no longer is trained on the rotation axis and the object is rotated again and digitized again. The new data obtained is used to fill in any "holes" in the 3-D digital model of the first rotation. If additional "holes" (occluded regions where good data has not yet been obtained) remain, the planar light sheet can be shifted yet again and digitized yet again to further fill in data. This can be repeated as many times as needed.

The second of the three methods involves moving the light sheet to a different position while the object moves through only one rotation. One way to accomplish this is to rotate the object through discrete angular positions, such as with the use of a stepper motor. At each angular position, the contours of the object can be captured, combined, and digitized multiple times with the light sheet moving to different positions in order to minimize occlusions. In this regard, the light sheet can be moved from an on-axis position to off-axis positions generally as described in the preceding paragraph. However, the illumination can be scanned across the object vertically as well as horizontally. Of course, in scanning vertically a spot of light can be employed rather than a thin sheet of light. Indeed, it is possible even to raster scan the light across the object.

The third of the three methods involves producing a single point of light instead of a sheet or plane of light. A computer would then move the point of light in a rapid raster fashion over the object, capturing the left and right camera images of the diffuse reflection. In this way, the rotation axis does not need to be known and the problems with shadows and occlusions can be more intimately explored. With proper camera calibration, the left and right cameras would then yield the instantaneous 3D position of the point of light and thus build up a 3D model through a collection of verticies.

While the invention has been described in preferred forms only, it will be obvious to those skilled in the art that many modifications, additions, and deletions can be made therein without departing from the spirit and scope of the invention as set forth in the following claims.

I claim:

1. An apparatus for digitizing an object for creating a three-dimensional digital model of the object, the apparatus comprising:

means for rotating the object about a rotation axis;

first and second light source means positioned and oriented for directing a planar sheet of light toward the object along an illumination plane, said illumination plane being substantially parallel to and substantially intersecting said rotation axis;

first detector means positioned to one side of said illumination plane and oriented for detecting light reflected along a first detection plane from the object for creating a plurality of first side contours as the object rotates;

second detector means positioned to a side of said illumination plane, opposite said one side, for detecting light reflected along a second detection plane from the object for creating a plurality of second side contours as the object rotates; and combining and evaluating means for combining said first side contours and said second side contours for generating a plurality of composite contours and for evaluating said composite contours for creating a three-dimensional digital model of the object.

2. An apparatus as claimed in claim 1 wherein said first and second light source means are adapted for directing light along first and second paths which are nonparallel to one another.

3. An apparatus as claimed in claim 1 wherein said first and second light source means each comprises means for generating a planar sheet of light which is non-scanning.

4. An apparatus as claimed in claim 3 wherein each of said means for generating a planar sheet of light which is non-scanning comprises an opaque optical element with a clear vertical slit formed therein.

5. An apparatus as claimed in claim 4 wherein each of said optical elements comprises a film slide.

6. An apparatus as claimed in claim 1 wherein said first and second detector means each comprises a black and white camera.

7. An apparatus as claimed in claim 6 further comprising a color camera for detecting an instantaneous color value of the object and wherein said combining and evaluating means is adapted for storing said instantaneous color values and said composite contours.

8. An apparatus as claimed in claim 1 wherein said first and second detector means are adapted for detecting light directly reflected from the object.

9. An apparatus as claimed in claim 1 wherein said combining and evaluating means comprises video storage means for storing said composite contours.

10. A method of digitizing an object for creating a three-dimensional digital model of the object, the method comprising the steps of:

(a) rotating the object about a rotation axis;

(b) directing a thin sheet of light toward the object along an illumination plane, said illumination plane being substantially parallel to and substantially intersecting the rotation axis;

(c) detecting light reflected from the object along a first detection plane for creating a plurality of first side contours as the object rotates;

(d) detecting light reflected along a second detection plane from the object for creating a plurality of second side contours as the object rotates;

(e) combining the first side contours and the second side contours for generating a plurality of composite contours; and (f) evaluating the composite contours for creating a three-dimensional digital model of the object.

11. A method as claimed in claim 10 wherein the step of directing a thin sheet of light toward the object comprises directing light from at least two light sources.

12. A method as claimed in claim 10 wherein the steps of detecting light reflected from the object along first and second detection planes each comprises detecting light intensity.

13. A method as claimed in claim 12 further comprising the step of detecting color values of light reflected from the object, and wherein the step of evaluating the composite contours for creating a three-dimensional model further comprises evaluating the color values.

14. A method as claimed in claim 13 wherein the step of detecting color values comprises detecting light reflected from the object substantially along the illumination plane.

15. A method as claimed in claim 11 wherein the step of directing light from two light sources comprises directing light from a first light source positioned generally above the object and directing light from a second light source positioned generally below the object.

16. A method as claimed in claim 10 wherein the step of directing a thin sheet of light toward the object comprises directing light from a steerable illumination source.

* * * * *